(12) United States Patent
Lee et al.

(10) Patent No.: US 7,854,282 B2
(45) Date of Patent: Dec. 21, 2010

(54) HYBRID ELECTRIC VEHICLE

(75) Inventors: David Warren Lee, Los Angeles, CA (US); Roeland M. M. Hogt, Woerden (NL)

(73) Assignee: International Humanities Center, Pacific Palisades, CA (US)

( * ) Notice: Subject to any disclaimer, the term of this patent is extended or adjusted under 35 U.S.C. 154(b) by 458 days.

(21) Appl. No.: 11/953,787

(22) Filed: Dec. 10, 2007

(65) Prior Publication Data
US 2009/0145674 A1 Jun. 11, 2009

(51) Int. Cl.
B60K 6/448 (2007.10)
B60W 10/00 (2006.01)
B60W 10/24 (2006.01)

(52) U.S. Cl. .............................. 180/65.24; 180/65.265; 180/65.285; 180/65.29

(58) Field of Classification Search ................ 180/65.1, 180/65.21, 65.22, 65.225, 65.24, 65.265, 180/65.27, 65.275, 65.285, 65.29, 65.51, 180/291, 68.5
See application file for complete search history.

(56) References Cited

U.S. PATENT DOCUMENTS

| | | | | |
|---|---|---|---|---|
| 5,549,172 A | * | 8/1996 | Mutoh et al. ............... | 180/65.1 |
| 5,594,318 A | * | 1/1997 | Nor et al. ..................... | 320/108 |
| 6,717,281 B1 | * | 4/2004 | Brandon et al. ........... | 290/40 C |
| 7,195,087 B2 | * | 3/2007 | Hatsuda et al. ........ | 180/65.285 |
| 7,665,553 B2 | * | 2/2010 | Tabe ........................... | 180/2.2 |
| 2004/0094928 A1 | * | 5/2004 | Amanuma ........... | 280/124.125 |
| 2005/0045392 A1 | * | 3/2005 | Maslov et al. .............. | 180/65.5 |
| 2005/0263332 A1 | * | 12/2005 | Chernoff et al. ........... | 180/65.1 |
| 2007/0271015 A1 | * | 11/2007 | Bauer et al. ................... | 701/33 |

\* cited by examiner

*Primary Examiner*—J. Allen Shriver, II
*Assistant Examiner*—John R Olszewski
(74) *Attorney, Agent, or Firm*—Wilson Sonsini Goodrich & Rosati

(57) ABSTRACT

A highly energy efficient automobile that provides payload, safety and performance capacities similar to a comparable vehicle of a given vehicle class. The current invention is ideal for short to medium range urban and suburban driving. The current invention incorporates components in a unique and novel way, in which these components combine to form a system that produces an automobile that reduces overall air pollution while encouraging the commercialization of alternative energy sources. The current invention features an lightweight, low rolling resistance, digitally controlled and direct-drive electric propulsion system. A lightweight spaceframe with a suspension system provides a structure for mounting a low-aerodynamic-drag body system and other components. An intelligent power and thermal management system coupled with a removable auxiliary power module supplies the electrical energy required. While the preferred embodiment is substantially a passenger vehicle, the current invention may be scaled to other land vehicles.

28 Claims, 10 Drawing Sheets

HYBRID ELECTRIC VEHICLE

FIELD OF THE INVENTION

The present invention relates to automobiles and, more particularly, to hybrid electric vehicles.

BACKGROUND OF THE INVENTION

Ever since automobiles were invented, there has been a need for a more energy efficient vehicle. A solution satisfying urban and suburban family transportation needs in a safe and fuel-efficient manner is desired by many for longer and more affordable commutes. In the past few decades, many scientific studies let to the belief that the increased used of automobiles worldwide is contributing to a global climate change phenomenon known as global warming, which is threatening the existence of many biological species and the current way of life of the populations in many countries. It is further believed that substituting fossil fuel uses with renewable or otherwise less polluting energy sources may result less drastic global warming effect. To further complicate the issue, the general population, substantially more so in the United States, tends to prefer larger vehicles. The demand for larger vehicles is satisfied essentially by truck-based vehicle platforms converted into passenger vehicles officially classified as light trucks. Truck platforms (or body-over-frame designs) tend to be heavy compared to regular passenger vehicles. And, the heavier the vehicle, the more energy is required to propel it over a given distance. The sharp increase in fuel consumption by light trucks collectively has been blamed for air pollution in major cities.

Obviously, there are many conventional fossil-fuel driven passenger cars (automobiles), light trucks and crossover vehicles. Vehicles are generally classified based on their sizes, weights and payload capacities. Larger light trucks, including Sports Utility Vehicles (SUV) and pickup trucks are often used as passenger vehicles and offer great versatility in terms of passenger and cargo carrying capacities. Crossover vehicles are defined as a car based platform with a light-truck appearance. Some of these vehicles are designed or retrofitted with a hybrid electric drivetrain to improve fuel economy. Examples of prior art electric cars, hybrid electric passenger cars, hybrid electric SUVs and hybrid electric crossovers are 2001-2007 Toyota Prius, 2005-2007 Toyota Highlander hybrid, 2007 Ford Escape Hybrid, 2008 Chevy Tahoe "Two-mode" Hybrid, 2008 GMC Yukon, 1997 General Motors EV1, AC Propulsion eBox and T-zero.

Some light trucks are outfitted with mechanical four-wheel-drive (4WD) or all-wheel-drive (AWD) transmissions and differentials to improve handling when driving in slippery road conditions. Examples are 2007 Audi Q7, 2007 Volkswagen Touareg and 2007 Toyota 4-Runner. These additional drive components adds significant amount of weight to the vehicles. Operating and maintaining a light truck is generally more expensive compared to smaller passenger vehicles due to higher fuel consumption and wear and tear on drivetrain parts because of the added weight. As a matter of fact, most of the off-road-capable vehicles sold in the United States are never taken off-road and yet they carry the extra weights of the heavy duty components, which severely impact their fuel efficiency compared to other lighter vehicle types of the same size. Therefore, it would be advantageous to incorporate a four-wheel-drive response without the transmission or differential parts.

Not realizing the benefits of the modularity and flexibility that an electric coupling can offer, many inventors resort to mechanical solutions in which the power sources and the drive wheels are joined by mechanical couplings, or incremental improvements on the transmission parts. Such designs are described in U.S. Pat. Nos. 5,558,589, 5,931,757, 6,090,005 for A TWO-MODE, COMPOUND-SPLIT, HYBRID TRANSMISSION, 6,360,834 for a HYBRID ELECTRIC VEHICLE, 6,579,201 for an ELECTRIC HYBRID FOUR-WHEEL DRIVE VEHICLE, 5,343,970 for a HYBRID ELECTRIC VEHICLE, 7,237,634 for HYBRID VEHICLES, 6,840,341 for PARALLEL HYBRID VEHICLE, 6,945,345 for HYBRID ELECTRIC VEHICLE HAVING ALTERNATE POWER SOURCES, 6,656,083 for a HYBRID DRIVE SYSTEM, 6,811,508 for a HYBRID TRANSMISSION, PARTICULARLY FOR MOTOR VEHICLES, 6,852,053 for a DRIVETRAIN FOR A VEHICLE, 7,261,661 for a PARALLEL HYBRID TRANSMISSION HAVING A SINGLE MOTOR/GENERATOR, 7,220,199 for an INFINITELY VARIABLE POWER BRANCHING TRANSMISSION WITH TWO OPERATING MODES, 7,210,546 for a CONTROLLER AND CONTROL METHOD FOR A HYBRID ELECTRIC VEHICLE POWERTRAIN, 7,017,693 for a DRIVE DEVICE FOR HYBRID VEHICLE and 6,936,991 for METHOD AND APPARATUS FOR MOTOR CONTROL.

Prior arts hybrid electric vehicles are typically smaller in size, mechanically complex and expensive to buy and maintain. They sometimes even the fuel savings of the entire lifetime of the vehicle cannot justify for the extra costs. Prior art electric vehicles, similar to the one described in U.S. Pat. No. 5,212,431 for ELETRIC VEHICLE, produce no emission on board but typically have limited passenger and cargo capacity or operational radius. The process of generating electricity on the power grid involves burning fossil fuel and, based on the current energy mix, the emission could be higher than some other alternative methods of generating electricity onboard. Due to the limitation in current battery technologies, electric vehicles are typically small, underpowered, expensive, and thus, according to General Motors Corporation, impractical to be deployed in a large scale. Prior art hybrid electric vehicles, conventional passenger cars and conventional light trucks alike lack the ability to adapt to other fuel sources. This creates a barrier to entry for alternative fuel businesses because the cost to retrofit a vehicle to use another fuel source is generally cost-prohibitive. Therefore, a solution that offers the owner of the vehicle the liberty to choose between multiple fuel sources is highly desirable.

Another problem is that while many consumers prefer larger vehicles because of the perceived safety of these larger vehicles, the reality is that most light trucks are built using existing commercial truck platforms. Higher centers of gravity and uneven weight distributions of a light truck also affect the vehicle's stability, which further increases the chance of a collision. Their body-over-frame designs also lack the sophisticated "crumble zones" commonly found in smaller passenger vehicles and make the occupants more susceptible to injuries during a crash. A modular design allows the designer to free up the space in front of the vehicle for more freedom in crumble zone design. Therefore, a solution that employs modular components, which allows designers to relocate components to meet the desired weight distribution and as a prerequisite to create improved crumble zone structures, is highly desirable.

It is therefore an object of the invention to improve energy efficiency compared to a similar prior art in the same vehicle class, which is typically measured by the amount of energy consumed over the distance traveled.

It is another object of the invention to meet the performance, safety and payload capacities of a similar prior art in the same vehicle class.

It is another object of the invention to provide an all-wheel-drive propulsion system to improve traction.

It is another object of the invention to reduce operational and maintenance costs compared to a similar prior art in the same vehicle class.

It is another object of the invention to sustain a longer service life compared to a similar prior art in the same vehicle class.

It is another object of the invention to operate on more than one energy source to increase demand for alternative energy sources.

It is another object of the invention to provide an electric propulsion system that is capable to operate entirely on electricity.

It is another object of the invention to enable economical aftermarket exchanges of onboard power plants.

SUMMARY OF THE INVENTION

In accordance with the present invention, there is provided a highly energy efficient hybrid electric vehicle that provides payload, safety and performance capacities comparable to a conventional vehicle of a given vehicle class. The current invention is a novel automobile that sustains highly energy efficient operation while satisfying urban and suburban driving needs. In the past few decades, many scientific studies let to the belief that the increased used of automobiles worldwide is contributing to a global climate change phenomenon known as global warming, which is threatening the existence of many biological species and the current way of life of the populations in many countries. It is further believed that substituting fossil fuel uses with renewable or otherwise less polluting energy sources may result less drastic global warming effect. The current invention is unique in that its basic electric propulsion system has the ability to adapt to different energy sources by changing a removable component simply and economically. The current invention, with the ability to adapt to different fuel sources, creates an increased demand for alternative fuels and renewable energy despite the uncertainty in government positions and high barrier to entry in the energy market. The current invention is scalable and applicable to all classes of vehicles, with arbitrary number of wheel axles. Typically, the lighter a vehicle, the more energy efficient it becomes. In a preferred embodiment, the majority of the chassis and the body of the current invention are made with lightweight materials. A direct-drive electric propulsion system eliminates the need for heavy transmission parts and drive shafts. Thus, combined with regenerative braking and other feature described in this disclosure, the current invention is generally more energy efficient and requires less maintenance than prior art gasoline or diesel vehicles of the same vehicle class, and superior to prior art hybrid electric vehicles or electric vehicles in terms of modularity, capacities, performance and the ability to use multiple fuel sources.

The current invention is a hybrid electric vehicle comprising a spaceframe, a body system, a suspension system, a propulsion system, a vehicle control system, a primary electrical system, a thermal management system and an auxiliary power module. A preferred embodiment described in this disclosure is a ground vehicle with two drive axles, two wheels on each axle, four doors and a rear hatch. The size and shape of the vehicle is substantially a light truck in the sports utility vehicle (SUV) category—comparable to a 2007 Toyota Highlander. The preferred embodiment is thus a so-called 4-by-4 or a four wheel drive (4WD) configuration.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
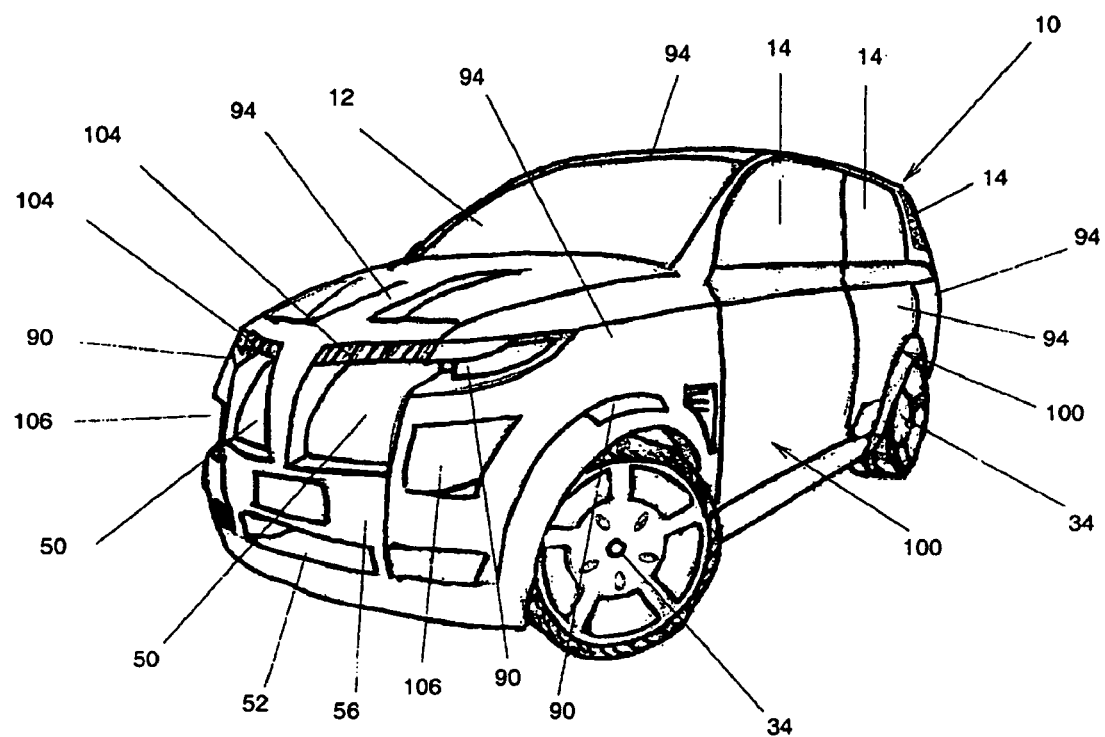
FIG. 1 is a front left perspective view of the current invention in its entirety.

The current invention is a hybrid electric vehicle comprising a spaceframe 32, a body system 10, a suspension system, a propulsion system 96, a vehicle control system 138, a primary electrical system, a thermal management system 28 and an auxiliary power module 30. A preferred embodiment described in this disclosure is a ground vehicle with two drive axles, two drive wheels on each axle, four doors 100 and a rear hatch 98. The size and shape of the vehicle is substantially a light truck in the sports utility vehicle (SUV) category—comparable to a 2007 Toyota Highlander.

Body Structure.

The main purpose of a spaceframe 32 is to provide structural support and mounting points for most of the other components on the preferred embodiment. Another purpose of the spaceframe 32 is to support the proper functioning of the suspension. Another purpose of the spaceframe 32 is to protect the occupants during a crash in any direction or a roof-crush incidence. Another purpose of the spaceframe 32 is to provide an exterior by which the overall styling and the aerodynamic properties are determined. Another purpose of the spaceframe 32 is to provide ingress and egress to and from the cabin compartment 112.

Figure 10:
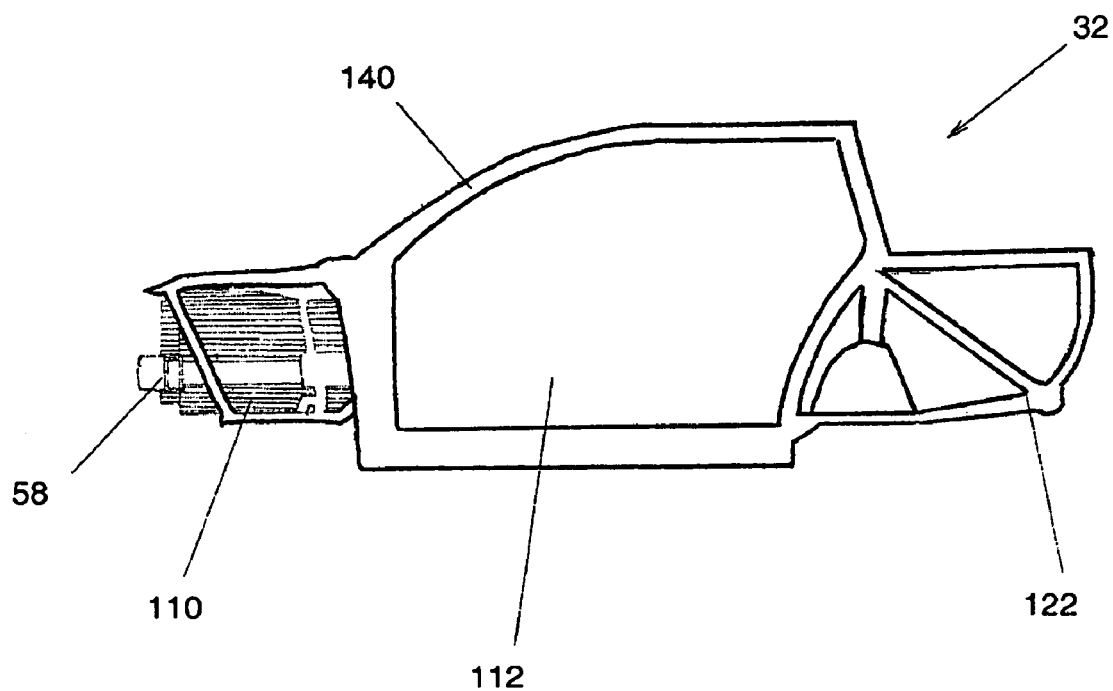
FIG. 10 is a left view of a spaceframe.

In a preferred embodiment, referring now to FIG. 10, the spaceframe 32 comprises a passenger cabin compartment 112 frame structure formed by rigid shell, a plurality of door frame structures, a plurality of rear hatch 98 frame structures, a front crumble zone 110, a rear crumble zone 122, front bumper 58, rear bumper and an undercarriage 116 for said cabin compartment 112. The spaceframe 32 defines the boundaries of various compartments within the vehicle and hence the space available for each. Hence, the design of the spaceframe 32 is typically application specific. The design of the spaceframe 32 not only affects aerodynamics but also human perceptions to the vehicle.

As a frame typically contributes to about 25% of a prior art vehicle by weight, the material selected for the spaceframe 32 is critical to the overall energy efficiency of the system. In a preferred embodiment, said passenger cabin compartment 112 frame structure, said door frame structures and said hatch 98 frame structure are created substantially using lightweight and low-cost polymer composite materials such as polycarbonate-Polyethylene Terephthalate (PET)-fiberglass composite materials with approximately 10% to 30% glass fill that provide the desired interior and exterior dimensions with a lighter overall weight than a conventional aluminum or steel prior art. The spaceframe 32 may be reinforced with metals to increase strength or durability at certain locations of the spaceframe 32. The spaceframe 32 provides the rigidity to resist collapse during a collision or a roof-crush incidence, and to support the proper functioning of the suspension. The front crumble zone 110 is a longitudinally mounted aluminum honeycomb structure. The rear crumble zone 122 may be made from the same longitudinally mounted aluminum honeycomb structure or simply an extension of the composite spaceframe 32.

Said aluminum honeycomb front crumble zone 110 and/or rear crumble zone 122 may be made from other metals or organic materials such as polycarbonate. The choice of material is a trade-off between the crush strength of the honeycomb structure, the amount of distance for crumbling, the deceleration (g-force) tolerable by the occupants and the regulations, and costs.

In a preferred embodiment, the spaceframe 32 is created using a thermoplastic and fiberglass blend; hence, the spaceframe 32 may be manufactured economically using injection molding techniques. The spaceframe 32 may be partitioned into three segments: left frame and right frame and connecting structures in between. The parts are later on glued, bolted or welded together to form the desired shape. The door frames and the rear hatch 98 frame are manufactured using similar techniques. The advantages of thermoplastics include being inexpensive, recyclable and rust-free.

The spaceframe 32 may also be fabricated using convention materials, such as aluminum and steel, and processes.

Body.

Figure 2:
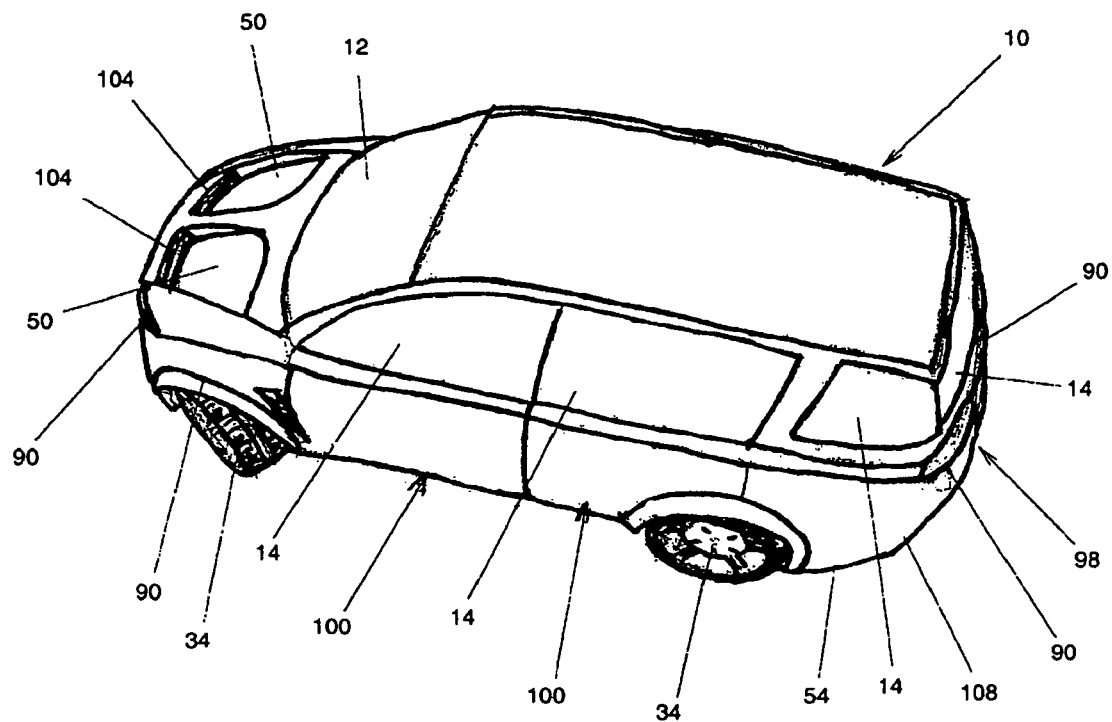
FIG. 2 is a left perspective view of the current invention in its entirety.

Referring now to FIG. 1 and FIG. 2, The body system 10 is the exterior of the vehicle, which comprises a plurality of body panels 94, a front windshield 12, a plurality of windows 14, a plurality of lighting elements 90, a plurality of wipers, a plurality of body controls 92, an upper front air diffuser 50, a lower front air diffuser 52, a plurality of side air diffusers 106, a lower rear air diffuser 54 and other accessories typically found in prior art vehicles. Said plurality of body panels 94 further comprises a roof panel, door panels, a plurality of quarter panels, a front bumper cover 56, a rear bumper cover 108 and a hood. The body system 10, in a preferred embodiment, is mounted over the spaceframe 32 such that the spaceframe 32 itself is not exposed.

The main purpose of the body system 10 is for isolating the interior and internal components from the elements. Another purpose of the body system 10 is to diffuse air flow efficiently when the current invention is in motion. Another purpose of the body system 10 is for, through the use of lightweight materials, reducing the weight and lowering the center of gravity of the vehicle, and thus improves energy efficiency and handling.

In a preferred embodiment, a body panel is made from a honeycomb structure, perpendicular to the vehicle surface, sandwiched between two sheets of polyurethane-fiberglass composite. The honeycomb body panels 94 provide exceptional strength-to-weight ratios. Other materials, such as metals, may be used to reinforce the composite materials to increase the structure's stiffness and thermal stability. Another implementation of the spaceframe 32 is a body-over-frame design, which is commonly used on trucks and heavy-duty vehicles. Body-over-frame is commonly used when a single chassis (spaceframe 32, suspension and propulsion system 96) is combined with different vehicle bodies to produce multiple functional variants.

The main purpose of the roof panel is to protect the occupants of the vehicle during a crash or a roof-crush incidence. The roof panel may be created using the same material as the body panel or a heat-formed polycarbonate sheet to give a transparent or semi-transparent appearance. A more specific purpose of a roof panel in a preferred embodiment is to collect solar energy and converts it into electrical energy for the electrical systems. To achieve this, photovoltaic cells 136 are organized and attached to either the upper or lower surface of the roof panel. Coupled with a voltage regulator, the cells are wired into the electrical system.

The main purpose of the plurality of body panels 94 is to create an aerodynamically efficient geometry in the front of the current invention to reduce aerodynamic drag during operation. The hood forms part of said upper front air diffuser 50. Another purpose of the plurality of body panels 94 in a preferred embodiment is to collect solar energy and converts it into electrical energy for the electrical systems. To achieve this, photovoltaic cells 136 are bonded to the upper surface of the hood. Coupled with a voltage regulator, the cells are wired into the electrical system.

Figure 8:
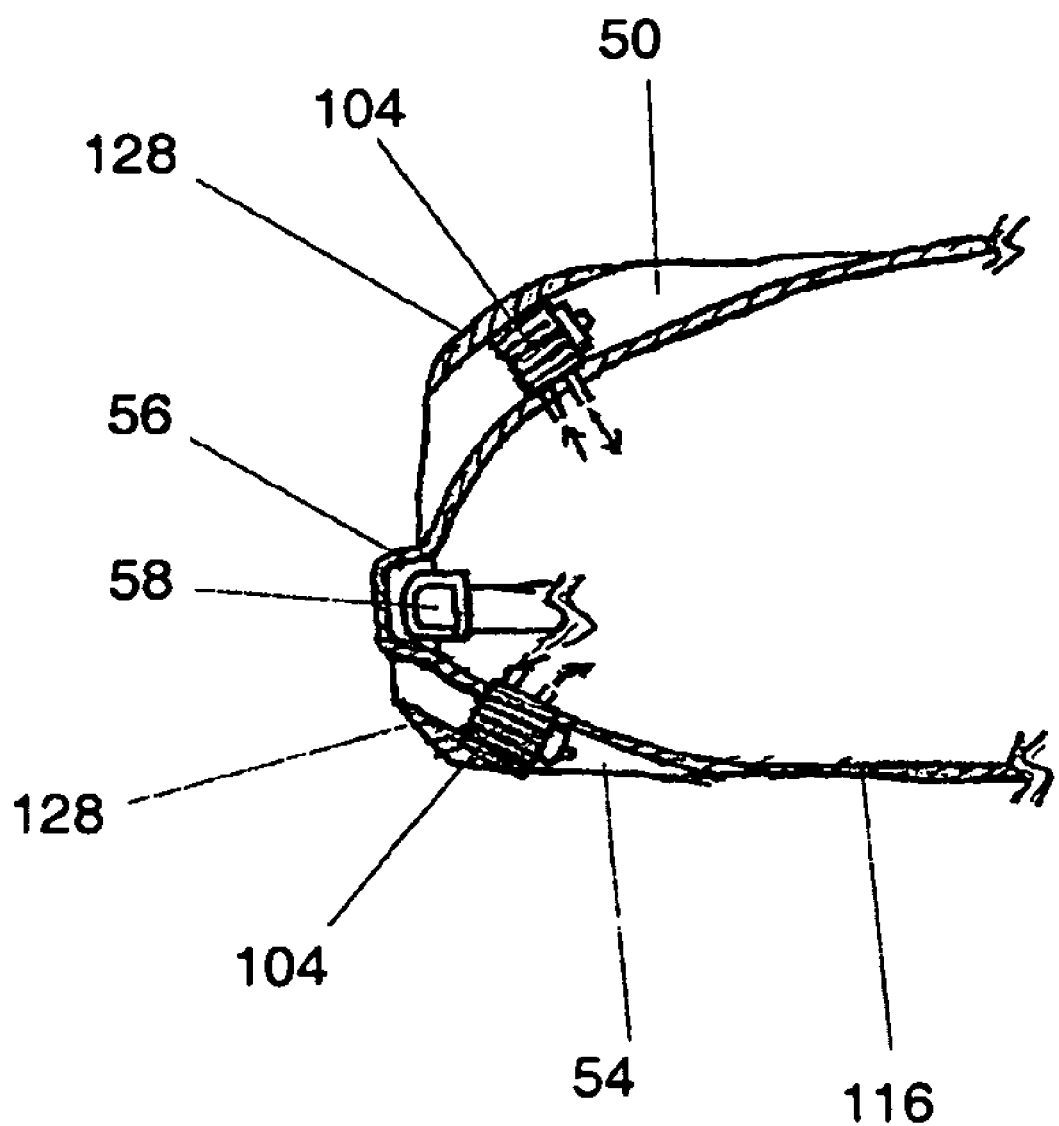
FIG. 8 is a left sectional view of a body system front section.

The main purpose of the front lower air diffuser and the front upper air diffuser is to create an aerodynamically efficient geometry in the front of the current invention to reduce aerodynamic drag during operation. Another purpose of the front lower air diffuser and the front upper air diffuser is for funneling cool air into the heat exchangers 104 of the thermal management system 28. The heat exchangers 104 may be mounted and hidden under the decorative diffuser covers 128 as show in FIG. 8.

The main purpose of the side air diffusers 106 is to create an aerodynamically efficient geometry in the front of the current invention to reduce aerodynamic drag during operation. Another purpose of the side air diffusers 106 is to support climate control 102 of the interior. Another purpose of the side air diffusers 106 is for funneling cool air into the auxiliary power module 30 to support, if applicable, internal combustion and cooling. To achieve this, air ducts are constructed behind the body panels 94 to redirect the incoming air to the air intake of the auxiliary power module 30, which is located in the mid-section of the current invention.

The main purpose of said body controls 92 is for detecting and controlling said body components, said windows 14 and said lighting elements 90. The body controls 92 comprise mechanical sensors for the doors 100, the rear hatch 98 and the windows 14, mechanical actuators for actuating the windows 14, locking and unlocking the doors 100, releasing the rear hatch 98 and activating the wipers and washers, switching the external lighting elements 90. Body components in question further comprise door catches, door locks. Said lighting elements 90 further comprise a plurality of headlamp assemblies, a plurality of rear lamp assemblies, a plurality of turn signal markers, a plurality of license plate lights and a plurality of interior lighting elements 90.

Suspension System.

The main purpose of the suspension system is to maintain traction between the tires and the road surface on which the vehicle is traveling. The suspension system is capable to support steering, acceleration and deceleration characteristics of the vehicle. The preferred embodiment of the current invention is very similar to some suspension systems found on conventional automobiles. In a preferred embodiment of the current invention, the suspension system comprises a front suspension 118 subframe, a rear suspension 120 subframe, a plurality of drive wheels on each subframe, anti-lock enabled hydraulic brake 124 system, electric parking brake 134 and the electric-assist steering column 82. In a preferred embodiment, the front suspension 118 will be a plurality of McPherson-type suspension assemblies and the rear suspension 120 will be a plurality of double-A arm suspension assemblies. In order to further reduce rolling resistance, hence increases energy efficiency, low-profile, high-pressure tires are utilized. The front suspension 118 subframe is further comprising a metal frame for mounting the suspension parts and for attaching the subframe to the spaceframe 32, a plurality of shock absorbers, a plurality of dampers, a plurality of wheel hubs, a plurality of constant velocity joints, a plurality of brakes and supporting components, a plurality of wheel bearings, a plurality of McPherson style lower control arms and a plurality of structures to support the steering function. The rear suspension 120 subframe is further comprising a metal frame for mounting the suspension parts and for attaching the subframe to the spaceframe 32, a plurality of shock absorbers, a plurality of dampers, a plurality of wheel hubs, a plurality of constant velocity joints, a plurality of brakes and supporting components that support a parking brake function, a plurality of wheel bearings and a plurality of double-A style lower and upper control arms and a structure for routing the parking brake cables. In a preferred embodiment, both rear and front suspension 118 subframes is further comprising the mechanisms to adjust alignments of the wheels.

For the two wheel drive (2WD) variant of the system, for example, a 4-by-2 configuration, constant velocity joints are not required on the non-driving axles. The vehicle may have a plurality of rear suspension 120 subframes, depending upon how many axles the vehicle comprises. In-hub wheel motors may be used in some variant of the system. In this case, since the front motor-generators and/or the rear motor-generators are mounted near the wheel hub assemblies, constant velocity joints will not be required.

Other variants of the suspension system or its subframes may be used to substitute the McPherson and double-A arm implementation of the preferred embodiment. Options includes but not limited to multilink and leaf springs.

The anti-lock enabled hydraulic brake 124 system is similar to that in a prior art vehicle like a 2007 Toyota Highlander. The hydraulic brake 124 system comprises a vacuum-assisted master cylinder, a vacuum pump, a brake fluid tank, a plurality of brake fluid hoses, a plurality of anti-lock brake (ABS) bleed valves and a hydraulic brake 124 at each drive wheel 34. Any power-assisted brake system with mechanical backup and dynamic control of the brake force may be also be used as a substitute. When commanded by the vehicle control computer 70, the bleed valves are opened to reduce the mechanical brake forces either because of output of the anti-lock brake or traction control algorithm or to prevent over-compensation by the braking forces generated by the electrical regenerative brake method.

Figure 9:
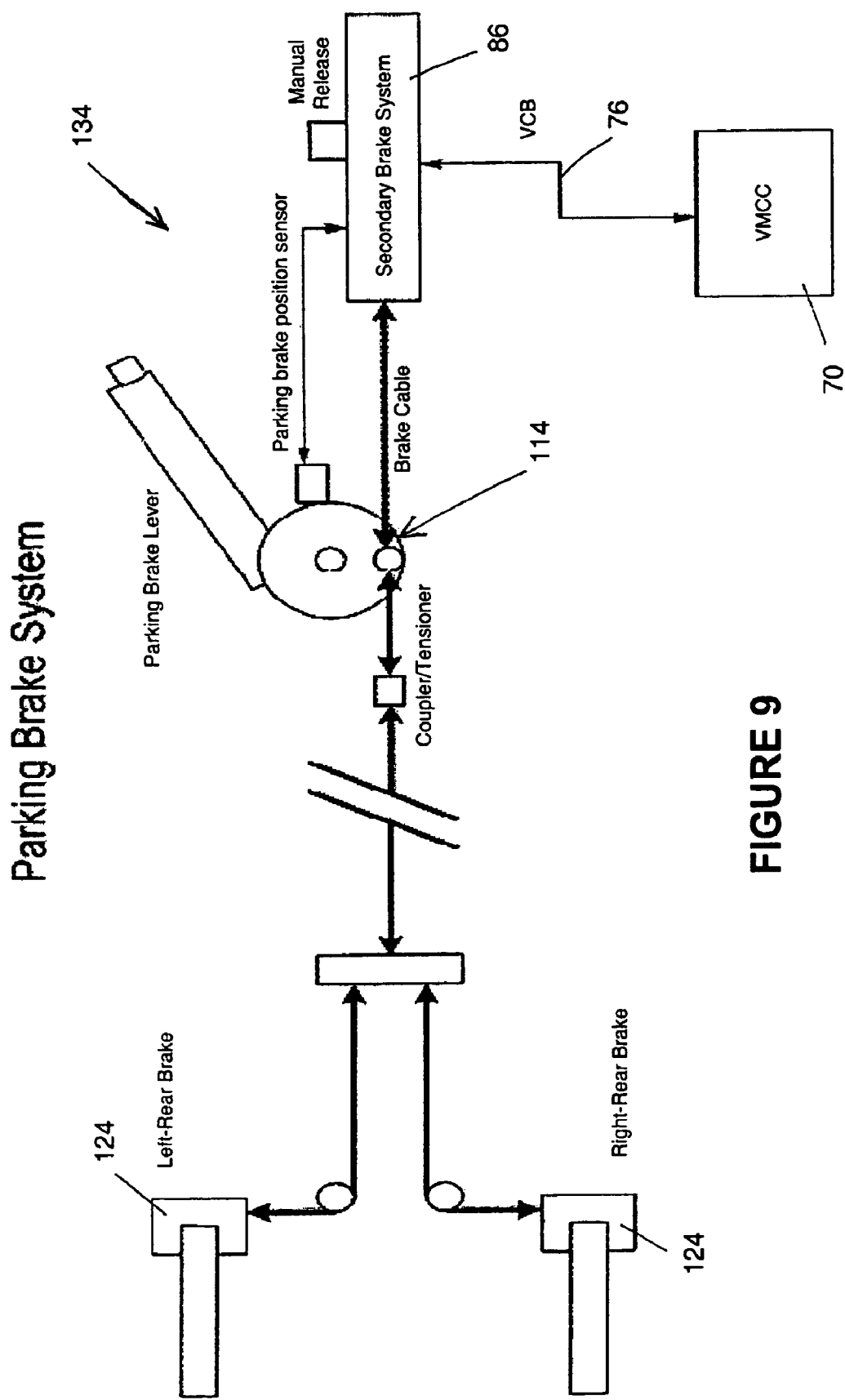
FIG. 9 is a block diagram view of an electric parking brake system.

Referring now to FIG. 9, the electric parking brake 134 comprises a parking brake handle, a cable pull system 114 and an electric parking brake electronic control unit 86. The purpose of the electric parking brake 134 is to apply brake force to two or more drive wheels when the vehicle is in Park mode. Another purpose of the electric parking brake 134 is to allow the operator to engage and disengage the parking brake manually. Due to the absence of an automatic transmission as in a prior art, the current invention requires the electric parking brake 134 to prevent movement when the vehicle is unattended. The electric parking brake electronic control unit 86 is connected to the vehicle control bus 76, which supplies power to the electric parking brake 134 and a data communication channel with the vehicle control computer 70. When commanded by vehicle control computer 70, potentially due to a change in driving mode, the electric parking brake 134 activates a servo motor to apply tension on the cable pull system 114 until it reaches a locked position. The cable pull system 114 is attached to the parking brake support features in said rear suspension 120 subframe. The tension causes said brake system to engage, hence applying brake forces to the drive wheels, and simultaneously causes the parking brake handle to rise, indicating to the operator that the electric parking brake 134 is engaged. The operator may disengage the electric parking brake 134 by pushing a mechanical button on the parking brake handle to release the parking brake from the locked position.

In order to reduce aerodynamic drag during high-speed cruising, a mechanism that allows run-time adjustments of ground clearance may be incorporated into the suspension. This mechanism may be powered by a set of hydraulic or electric actuators (such as worm drives). One possible implementation to push the drive wheel 34 assemblies downward, and thus lifting the vehicle to create more clearance. Another possible implementation is to install hinges in the spaceframe 32 to lower/rise the entire front and rear suspension 120 assembly.

Propulsion.

Figure 3:
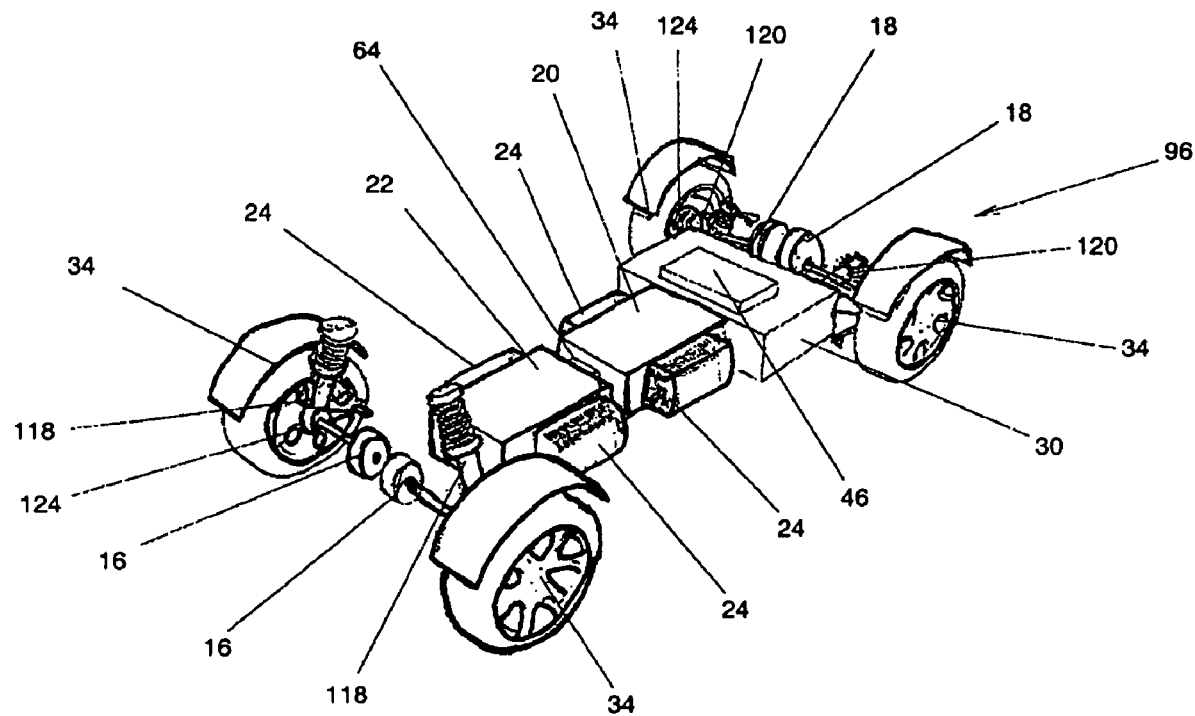
FIG. 3 is a front left perspective view of a propulsion system with primary electrical system components.

In a preferred embodiment, referring now to FIG. 3, the propulsion system 96 comprises a plurality of high-power motor-generators 18 on the rear axle and a plurality of continuous-duty motor-generators 16 on the front axle, four dissimilar high-power vector-drive motor controllers 24 and anti-lock brake bleed valve actuators. The two sets of motor-generators may be optimized at different rotational speeds in order to maintain high overall efficiency over any given drive cycle. The two sets of motor-generators can be rated at different power and voltage levels. The power distribution between the front and rear motor-generators are controlled by the vehicle control computer 70 of the vehicle control system 138. The main purpose of the propulsion system 96 is to provide the vehicle the ability to accelerate and decelerate longitudinally in either direction. Another purpose of the propulsion system 96 is to provide regenerative braking capability to convert kinetic energy into electrical energy. Another purpose of the propulsion system 96 is to provide traction control similar to a conventional fully mechanical all-wheel-drive system. Each of the motor-generators is connected to a drive wheel 34. Another purpose of the propulsion system 96 is to reduce frictional and parasitic losses and to lower the weight of the current invention compared to prior arts, further increasing the energy efficiency of the current invention.

In a preferred embodiment, the liquid-cooled continuous-duty motor-generators 16 and the liquid-cooled high-power motor-generators 18 the propulsion system 96 are independently connected to the wheels through constant velocity joints (or CV-joints), without transmissions or differentials. The weight and the frictional losses of the propulsion system 96 are significantly reduced by not having transmissions and differentials. The plurality of vector-drive motor controllers 24 are further commanded by the vehicle control computer 70 through four independent electrical or optical connections. Fiber optics with pulse-width modulated signals or digital signals are possible implementations of these connections.

The motor controllers 24 decode the signals from the vehicle control computer 70 and translate them to motor outputs such as torques. Wheel speed sensors, such as optical encoders, Hall-effect sensors and inductive rotational speed sensors, mounted on each of the continuous-duty motor-generators 16 and each of the high-power motor-generators 18, measure wheel speeds. And, based on these inputs, the vehicle control computer 70 then calculates the slip ratio of each drive wheel 34 to ascertain road conditions. The vehicle control computer 70 electronically adjusts the power output of each drive wheel 34 via the motor controllers 24 to optimize the traction produced at each wheel based on the algorithms for anti-lock brake control, traction control and roll and yaw electronic stability controls, in essence fulfilling the purpose of a conventional all-wheel-drive (AWD) system.

In a preferred embodiment, regenerative braking is accomplished through the vector-drive motor controllers 24. When the brake pedal 66 is depressed, the vector-drive motor controllers 24 are commanded by the vehicle control computer 70 to create reverse torque on the drive wheels, thus putting the front motor-generators and rear motor-generators in regenerative mode. Kinetic energy is converted into electrical energy by the continuous-duty motor-generators 16 and the high-power motor-generators 18 and absorbed by an array of capacitors known as an ultracapacitor 22, which is, and a battery array 20 in the primary electrical system. Reverse torque is created at each drive wheel 34 during the process and slows the current invention. If the energy storage devices are at full capacity, the excess electrical energy may be dissipated through a shunt resistor connected to the power distribution and management bus 80 or by commanding the high-power motor-generators 18 to commutate in reverse; combined with said mechanical brakes, the system can achieve the desired braking force. To maintain full mechanical backup, depressing the brake pedal 66 causes an increase in the hydraulic pressure in anti-lock enabled hydraulic brake 124 system. In the absence of regenerative braking, potentially due to a failure in the system, said pressure is sufficient to operate the mechanical brake to its full extent to slow the vehicle. In the presence of regenerative braking, the anti-lock brake bleed valve actuators are electronically activated by the vehicle control computer 70 to relieve said pressure to reduce the effects of mechanical braking.

Additional benefits of having a direct-drive electric propulsion system 96 include reduced torque steering and body-twisting effect. The motor-generator pairs and the motor controllers 24 can be air-cooled or liquid-cooled, depending on the demand. Alternatively, the propulsion system 96 may comprise of two motor-generators and motor controllers 24 instead of four in either a rear-wheel-drive (RWD) or front-wheel-drive (FWD) mode configuration. In a two-wheel-drive mode, the vehicle control system 138 electronically adjusts the power output of each wheel to reproduce the mechanical responses typically found in a prior art two-wheel-drive system.

Alternatively, any two motor-generators on an axle may be combined using a conventional differential, similar to the rear or front drive axle of a conventional automobile.

In-hub wheel motors may be used in some variant of the system. In this case, since the front motor-generators and/or the rear motor-generators are mounted near the wheel hub assemblies, constant velocity joints will not be required.

Controls.

Figure 4:
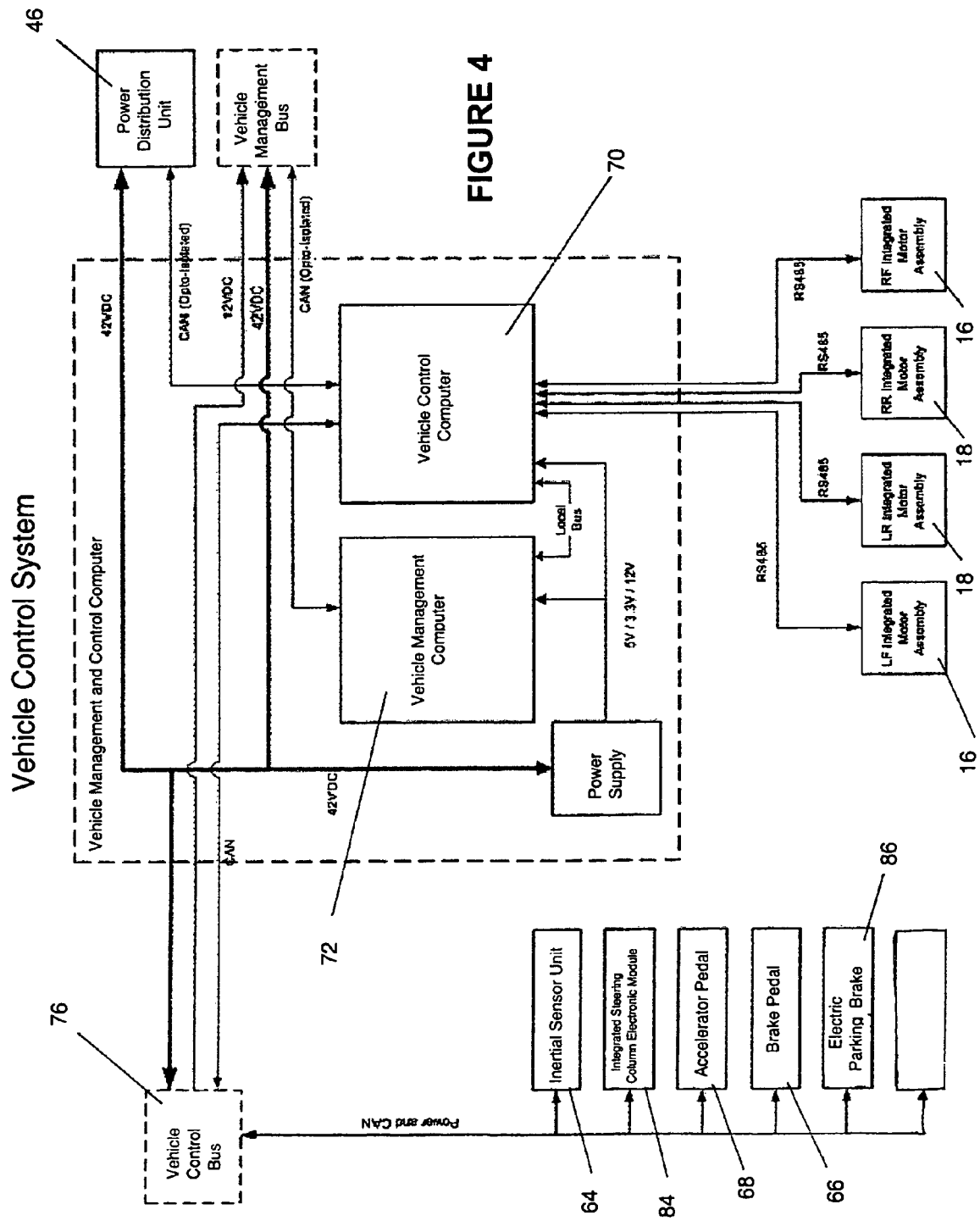
FIG. 4 is a block diagram view of a vehicle control system.

In a preferred embodiment, referring now to FIG. 4, the fail-safe vehicle control system 138 comprises a vehicle management computer 72, a vehicle control computer 70, a steering wheel angle sensor 84, a wheel speed sensor at each wheel, an inertial sensor unit 64, an accelerator pedal 68, a brake pedal 66, a drive mode selector 74, an instrument cluster 88 and a vehicle control bus 76. In a preferred embodiment, these two electronic controllers reside in the same integrated electronic assembly, hence be able to share data via a local data bus through the backplane of the electronic assembly. The main purpose of the vehicle control computer 70 is to execute vehicle control laws comprising software algorithms for controlling acceleration, deceleration, regenerative braking, power management, steering, AWD electronic differentials, anti-lock brakes and electronic stability controls (hereinafter referred to as "the control laws" collectively). Another purpose of the vehicle control computer 70 is to sample, filter and analyze the input signals for the control laws. The vehicle control computer 70 samples electronic signals including but limited to the drive mode selector 74 position, steering wheel position, wheel speeds, inertial measurements, the accelerator pedal 68 position and the brake pedal 66 position. These inputs are then fed into the control laws, which will calculate the optimal motor outputs to collectively produce the desirable mechanical response at the drive wheels. The results of such calculation is then sent to the motor controllers 24 and translated into motor outputs. The vehicle control computer 70 comprises a real-time, fail-safe microprocessor, supported by the necessary said input and output capabilities such as analog inputs and outputs, digital inputs and outputs and connection to the vehicle control bus 76, an opto-isolated data connection to the power management unit 46 and opto-isolated digital interfaces to each of the four the motor controllers 24.

The main purpose of the instrument cluster 88 is to display the digital signals on the vehicle control bus 76 into a human-readable form to inform the driver of the current invention the status of the vehicle. The instrument cluster 88 is typically located on the dashboard.

The main purpose of the drive mode selector 74 is to simulate the mode selection control of an automatic transmission of a prior art automobile. In a preferred embodiment, the drive mode selector 74 comprises four electronic buttons each representing one of the four driving modes: Park, Reverse, Neutral and Drive. The drive mode selector 74 is connected to the vehicle control bus 76 and is an essential input device to the vehicle control computer 70. An electronic signal is sent to the vehicle control computer 70 via the vehicle control bus 76 when one of the four buttons is depressed. The vehicle control computer 70 then determines the proper driving mode the system is in, based on operator's input and the statuses of safety interlocks.

Figure 6:
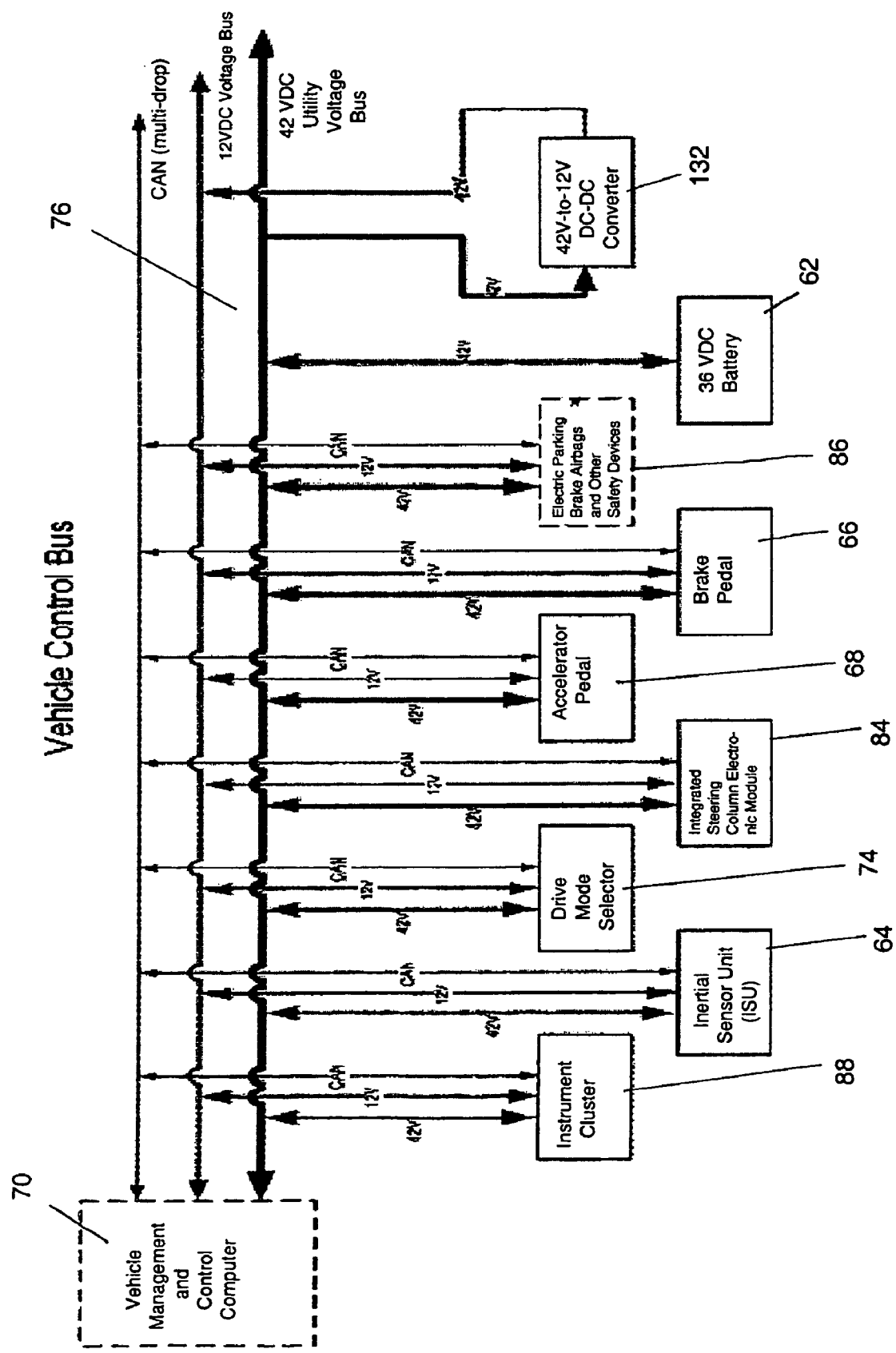
FIG. 6 is a block diagram view of a vehicle control bus.

In a preferred embodiment, referring now to FIG. 6, the vehicle control bus 76 comprises a high-speed digital communication medium, a plurality of electrically conductive media for delivery of electrical power and a rechargeable backup battery 62. The main purpose of the vehicle control bus 76 is to allow data exchange between the different components of the vehicle control system 138. Another purpose of the vehicle control bus 76 is to provide uninterruptible power to all safety related functions of the current invention comprising to the brake system, electric-assist steering column 82, safety restraints, wipers, headlamps, signal lamps, tail lamps and the instrument panel. During operation, the electrical power available on the vehicle control bus 76 is generated by a step-down converter 60, which is part of the power distribution and management bus 80, and delivered under the power management unit's control. The main purpose of the high-speed digital communication medium is for exchanging electronic data essential to the proper functioning of the vehicle control system 138. The high-speed digital communication medium is typically implemented using an industrial standard controller area network (or CAN) bus. Another possible purpose of the vehicle control bus 76 is to provide legacy voltage (e.g. 12 VDC) to prior art components that has not been retrofitted to use the common bus voltage on the vehicle control bus 76. When applicable, additional wiring and a legacy voltage power supply 132, which is essentially a DC-to-DC converter, provides the voltage needed.

The main purpose of the backup battery 62 is to provide a temporary voltage hold-up when the low voltage supply from the power management unit 46 failed or during startup or shutdown processes of the current invention when the high voltage supply is disabled for safety reasons. The backup battery 62 is constantly being recharged to its holdup voltage during operation.

Depending on the level of sophistication of the actual implementation, vehicle control computer 70 could potentially be an array of such computers, each one performing similar functions hence providing hardware redundancy to satisfy fail-safe and/or fail-operational requirements. Another essential function of the VMC is the control of acceleration and regenerative braking. During deceleration, the front motor-generators and the rear motor-generators continue to spin due to the inertia of the vehicle. The regenerative braking control algorithm in the VMC will instruct the PDU in the primary electrical system to direct the electrical current generated by the wheel motors to the battery pack to be stored.

During normal operation, the vehicle control computer 70, the vehicle management computer 72, the power management unit 46 and the battery controller 26 and the motor controllers 24 will closely monitor the status of all components for any electrical or mechanical anomalies. Visual indications to the driver may also be provided as to the status of the vehicle.

Optionally, the current invention may implement a user-activated override switch—allowing the driver to temporarily disable all or a subset of the system monitoring function. This will allow the vehicle control computer 70 to overload the system to output maximum performance as needed, at the expense of potential overheating and shortening the useful lives of the components.

Figure 7:
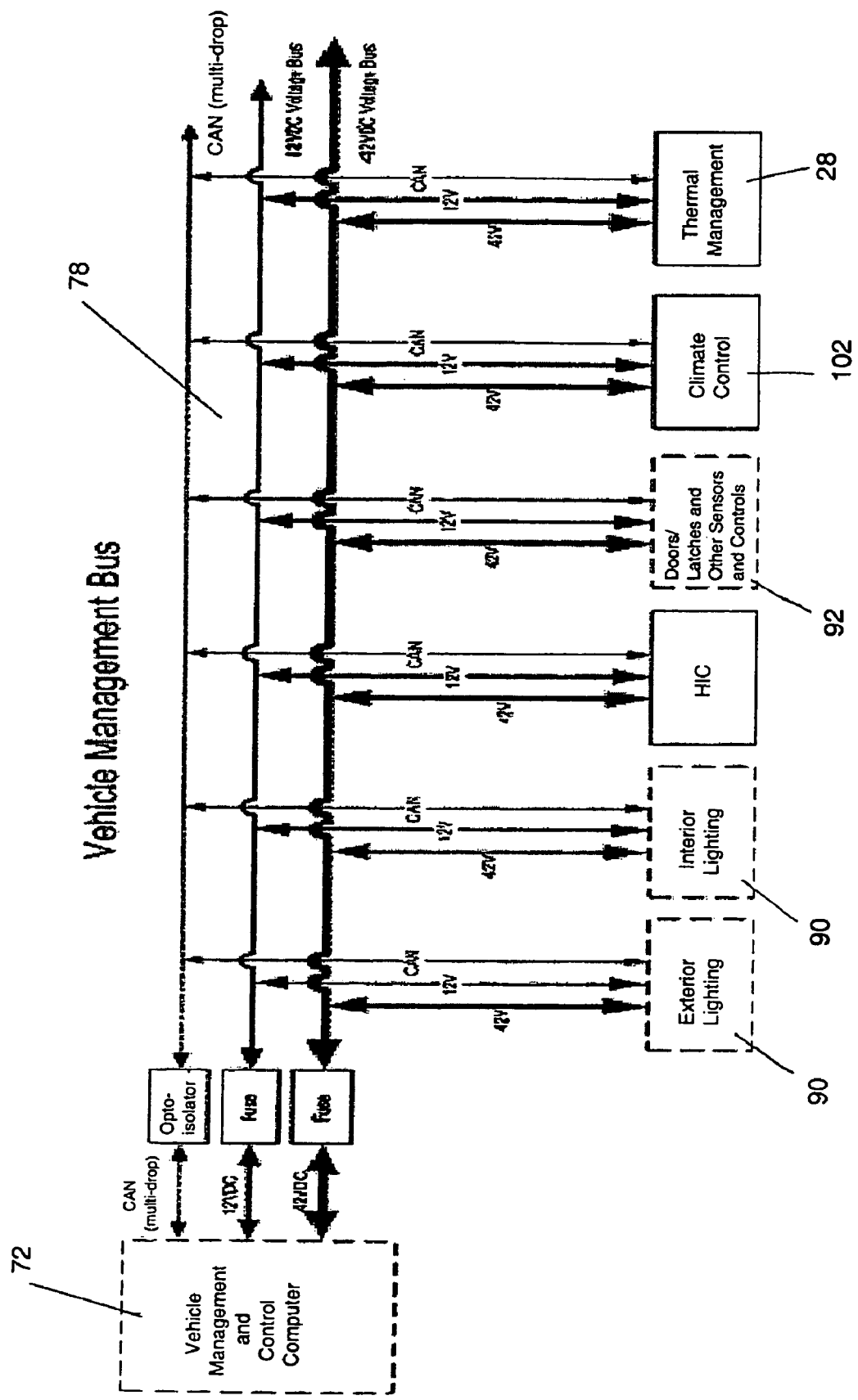
FIG. 7 is a block diagram view of a vehicle management bus.

In a preferred embodiment, referring now to FIG. 7, the vehicle management bus 78 comprises a low-speed digital communication medium and a plurality of electrically conductive media for delivery of electrical power. The main purpose of the vehicle management bus 78 is to allow the vehicle management computer 72 to receive control signals from and to deliver commands to non-real-time subsystems including but not limited to said body controls 92, thermal management, interior climate control 102. During operation, the electrical power available on the vehicle control bus 76 is generated by the step-down converter 60, which is part of the power distribution and management bus 80, and delivered under the power management unit's control. The main purpose of the low-speed digital communication medium is for exchanging electronic data essential to the proper functioning of non-real-time subsystems. The high-speed digital communication medium is typically implemented using an industrial standard controller area network (or CAN) bus.

Certain failure modes of the electronic components in the electric propulsion system 96 may lead to differential torque between the left and the right of the vehicle. For example, if one of the four motor controllers 24 fails and if not handled properly, the system may create said differential torque, which may lead to complete loss of steering control. The vehicle control computer 70 further comprises monitoring circuitry and software algorithms to detect such failure modes and handle the failures accordingly. Motor controllers 24 comprise local fault detection circuitries and electrical means for the vehicle control computer 70 to disengage one or more motor controllers 24 when a local failure occur. The electric-assist steering column 82 and the regenerative brake system further comprise a non-electrical means for the operator to maintain steering and braking controls respectively.

Electrical System.

Figure 5:
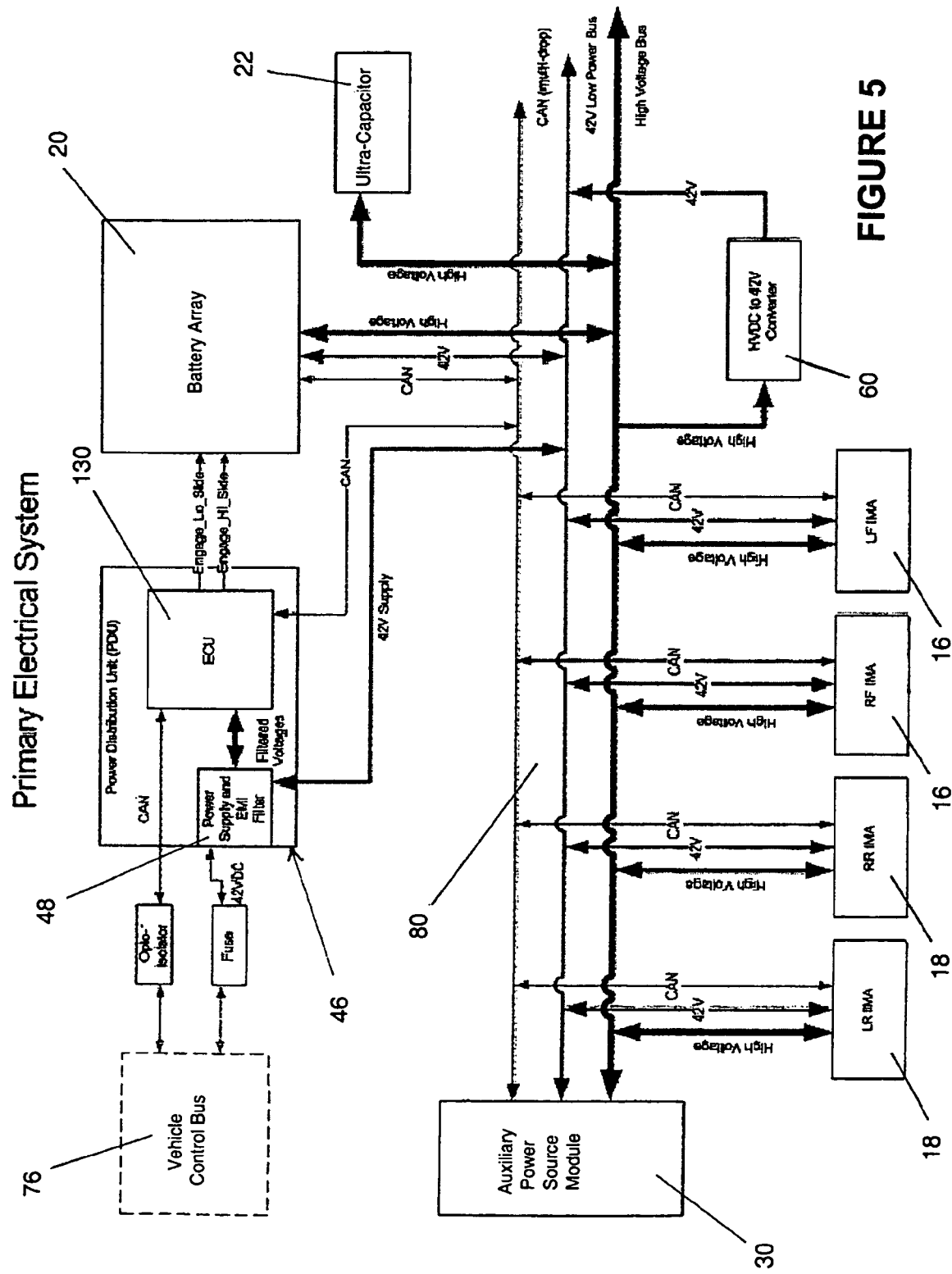
FIG. 5 is a block diagram view of a primary electrical system.

Referring now to FIG. 5, The primary electrical system comprises a power distribution and management bus 80, a battery array 20, a battery controller 26, a shunt resistor unit, an ultracapacitor 22, a power management unit 46, a step-down converter 60, a charger unit and an optional adaptor to an off-board support station. The main purpose of the primary electrical system is to provide power to the propulsion system 96 and to recapture energy during regenerative braking. Another purpose of the primary electrical system is to provide electrical energy to the vehicle said control bus and said vehicle management bus 78.

The main purpose of the power distribution and management bus 80 is to provide a digital communication channels for electronic data essential to the proper functioning of the high power devices comprising the propulsion system 96, the battery array 20, the ultracapacitor 22, the power management unit 46, the charger unit and the optional adaptor to the off-board support station. Another purpose of the power distribution and management bus 80 is to provide a low-voltage supply to the vehicle control bus 76 and vehicle management bus 78.

The power management unit 46 further comprises an electromagnetic interference filter 48 circuit and a power management electronic control unit 130. The main purpose of the power management unit 46 is to optimize the distribution of electrical energy across a plurality of devices on the power distribution and management bus 80. Another purpose of the power management unit 46 is to transfer energy from one high-power energy storage device to another. The power management electronic control unit 130 comprises the microprocessor and switching circuits to effectively calculate the desired energy distribution and to perform the transfers of energy. For example, when the current invention is at a complete stop, energy is transferred from the battery array 20 to the ultracapacitor 22 to prepare the primary electrical system for surge in power output due to an imminent acceleration. Another purpose of the power management unit 46 is to provide a low-voltage supply to the vehicle control bus 76 and vehicle management bus 78. Another purpose of the power management unit 46 is to filter the conducted electromagnetic noises from the high-power devices on the power distribution and management bus 80 and prevent them from entering the vehicle control bus 76 or vehicle management. Radiated electromagnetic noises are contained by shielding.

The main purpose of the step-down converter 60 is to step-down the voltage on the high-voltage bus of the power distribution and management bus 80 and to regulate the output voltage on the low-voltage bus.

The battery array 20 comprises a battery controller 26, a series of interconnected rechargeable battery cells, a plurality of temperature sensors, a plurality of current sensors and a plurality of voltage sensors. The main purpose of the battery array 20 is to provide the current invention the option to operate entirely on electricity. Another purpose of the battery array 20 is to store electrical energy for use by the propulsion system 96 and other subsystems. Another purpose of the battery array 20 to capture the excess electrical energy generated by the auxiliary power module 30 under the module's optimal operating conditions. A portion of the electrical energy generated by the auxiliary power module 30 directly powers the front motor-generators and the rear motor-generators, while the rest of the energy is diverted to the ultracapacitor 22 and the battery array 20 for storage. The battery cells are connected in such a way to create a higher voltage needed to drive the wheel motors. State-of-the-art Lithium-ion batteries offer cycle lives, energy densities and power densities suitable for an electric vehicle application. However, other rechargeable battery types, such as Nickel-Metal-Hydride, Nickel-Cadmium or Lead-Acid, may be used instead of the lithium-ion chemistry. The main purpose of the battery controller 26 is to control the charging and discharging processes of the battery cells according to their manufacturer's specifications by monitoring their state-of-charge and regulating the charge voltage. Another purpose of the battery controller 26 is to monitor for any operational anomalies, including but not limited to over- or under-voltage, over- or under-current, over- or under-temperature. Another purpose of the battery controller 26 is to attempt to rectify the situation or to shut down the battery array 20 when such operational anomalies are detected. Another purpose of the battery controller 26 is to provide a digital control interface of the battery array 20 to the power management unit 46 via the power distribution and management bus 80.

The size of battery array 20 in primary electrical system may be customized based on the application. However, in order to store the energy produced by regenerative braking and to support the efficient operation of the auxiliary power module 30, at least some energy storage is required.

The main purpose of the shunt resistor unit is to monitor the high voltage supply on the power distribution and management bus 80. Another purpose of the shunt resistor is, during an over-voltage condition, to crowbar the bus to lower the voltage and dissipate the excess electrical energy as heat. The shunt resistor unit comprises of an analog voltage monitor, which in turn control a relay or a solid-state switch to crowbar the high voltage supply of the power distribution and management bus 80. The same may be accomplished using a zener diode. In a preferred embodiment, the shunt resistor unit is liquid-cooled by the coolant supplied by the thermal management system 28. The liquid cooling may be substituted by forced or natural convection cooling by air.

In a preferred embodiment, the charge unit of the current invention comprises also an adapter cable to a household or industrial power grid, a charger electronic control unit, a power rectifier and optionally an inverter circuit. The main purpose of the charger unit is to enable the current invention to operate entirely on electricity, thus making it an electric vehicle. Another purpose of the charger unit is to enable the current invention to operate as a plug-in hybrid electric vehicle. Another purpose of the charger unit is to enable the current invention to operate as a grid-connected hybrid vehicle, in which the vehicle provides electrical power to the power grid. Another purpose of the charger unit is to convert the electrical energy from the power grid into the form of electrical energy usable on the power distribution and management bus 80. The main purpose of the charger electronic control unit is to monitor and control the input and output and operating conditions of the charger unit and to shutdown the charger unit when over-voltage, over-current, over-temperature. Another purpose of the charger electronic unit is to interpret commands from and to assess and report status to the power management unit 46, which determines the status of certain interlocks to prevent unsafe operations of the current invention. The purpose of the power rectifier is to convert the standard power grid alternative current (AC) supply into a direct current (DC) supply defined by the power distribution and management bus 80.

For a grid-connected hybrid application, which refers to an infrastructure that uses a collection of hybrid electric vehicles to power the grid during a brown-out event, an inverter unit may also be implemented. The purpose of the inverter unit is to redirect the electrical energy on the power distribution and management bus 80 back to the power grid, and in the process, converting electricity to the appropriate voltage and waveform demanded by the grid. The electrical interface may be designed to interface with a commercial electric vehicle or plug-in hybrid electric vehicle charger for a faster recharge time.

Thermal Management.

The thermal management system 28 comprises an electric coolant pump, an electronic control unit, a plurality of hoses, a liquid coolant and a plurality of heat exchangers 104. The main purpose of the thermal management system 28 is to remove excess thermal energy from the subsystems of the current invention. These subsystems include but are not limited to the propulsion system 96, the auxiliary power module 30, the battery array 20, the power management unit 46, the ultracapacitor 22, the shunt resistor unit, the vehicle control computer 70 and the vehicle management computer 72. The coolant comprises essentially of a mixture of water and an anti-freeze agent, such as polypropylene. The electric coolant pump comprises of a water pump that is similar to those used in prior arts but driven by an electric motor instead. The purpose of the coolant pump is to circulate the coolant through the different subsystems and the heat exchanger. The purpose of the heat exchangers 104 is to release the excess thermal energy into the air flowing through the heat exchangers 104. A heat exchanger also comprises a plurality of electric fans to increase air flow when needed. The main purpose of the electronic control unit is to control the speeds of the electric fans and the speed of the electric coolant pump based on the electronic signals received from the vehicle management bus 78.

Power Generation.

The main purpose of the auxiliary power module 30 is to provide electrical energy for the proper functioning of the current invention via the power distribution and management bus 80. Another purpose of the auxiliary power module 30 is to make the current invention capable of economically adapting to different fuel sources in the aftermarket. Another purpose of the auxiliary power module 30 is to provide the option to operate the current invention entirely on electricity.

The auxiliary power module 30 is a self contained unit with its own fuel system, exhaust system and emission control if necessary. In a preferred embodiment, the auxiliary power module 30 comprises a power module electronic control unit, an air inlet, an air filter, a diesel engine, a cooling system, an electric starter generator, a voltage regulator, a fuel system, an exhaust system, an emission control, an enclosure and an electrical connection to the power distribution and management bus 80. The main purpose of the power module electronic control unit is to monitor and control the diesel engine, much like the electronic control unit for prior art engine, and to monitor and control the voltage regulator. The purpose of the air inlet, the air filter, the fuel system, the exhaust system and the emission control is to support the operation of the diesel engine, much like a prior art vehicle. Another purpose of the power module electronic control unit is to interpret commands from and to assess and report status to the power management unit 46. The coolant may be supplied by the current invention's thermal management system 28. The output shaft of the diesel engine is connected to the electric starter generator, with or without gears in between. The main purpose of the starter-generator is to convert the kinetic energy of the output shaft of the diesel engine to electrical energy. Another purpose of the starter-generator is to create the initial torque necessary to start the diesel engine from stall, when commanded by the power module electronic control unit to do so. The electrical output of electric starter generator is connected to the voltage regulator. The main purpose of the voltage regular is to regulate the output voltage to meet the demand of the primary electrical system. Another purpose of the voltage regulator is to monitor input and output currents and input and output voltages and shut down the auxiliary power module 30 if over-current or over-voltage conditions are detected. The power module electronic control unit and the voltage regulator output are connected to the electrical interface to the power distribution and management bus 80, which provides high-voltage electrical connection with the high-power devices on the bus, a low-voltage supply for low-power electronics and a digital communication channel with the power management unit 46.

The components of the auxiliary power module 30 are mounted on the enclosure. And the entire assembly is mounted in the mid section of the spaceframe 32, substantially in the area below the second row seats. The purpose of the enclosure is to provide structural support to the components during normal operation. Another purpose of the auxiliary power module 30 is to provide mechanical support to the spaceframe 32 during normal operation. Another purpose of the auxiliary power module 30 is to provide mechanical support and to absorb impact during a vehicle collision. Another purpose of the enclosure is for attaching the auxiliary power module 30 to the spaceframe's mechanical interface for an auxiliary power module 30.

The mechanical interface and the electrical interface of the auxiliary power module 30 are defined by the specification of the current invention and are application specific, called a common interface control definition. The purpose of the common interface control definition is encourage third party and aftermarket designs, sales and serving of the auxiliary power module 30 and thus allowing the current invention to promptly adapt to consumer preferences for alternative fuel sources. Another purpose of the common interface control definition is to enable a quick and economical means to retrofit the current invention with another auxiliary power module 30 if the owner of the vehicle so choose. Another embodiment of the auxiliary power module 30 in an all-electric application the diesel engine and support hardware is substituted with electrically rechargeable energy storage device, such as another battery array 20, another ultracapacitor 22 or a high-capacity flywheel. The power management unit 46 reconfigures itself based on the configuration data available on the power module electronic unit via the power distribution and management bus 80, and adjusts the power management algorithm to take advantage of the additional energy storage capacity. Other embodiments may involve the use of fuel cells, hydrogen fuels, natural gas fuels, gasoline, bio-diesel, heat engines, and other systems that converts some forms of energy into electricity usable by the primary electrical system.

Modes of Operations.

The current invention, though not requiring an automatic transmission, simulates the ease-of-use of an automobile equipped with automatic transmission.

To begin using the invention, the operator enters the vehicle and position himself in the driver seat, behind the dashboard and the instrument panel, where the operator has direct access to the steering wheel, the accelerator pedal 68, the brake pedal 66 and the drive mode selector 74. Once the operator authenticated himself/herself using a key, the current invention enters a stand-by mode awaiting further input from the operator. The operator select one of the four driving modes: Park, Reverse, Neutral or Drive. The operator then commands the current to accelerate by depressing the accelerator pedal 68. To stop or decelerate, the operator releases the accelerator pedal 68 and depresses the brake pedal 66. Other vehicle interfaces, such as turn signals, wipers, windows 14 controls, etc. are much the same as a conventional vehicle.

To utilize electric fuel from the power grid to recharge the current invention, the operator will plug the power cord that is part of the onboard charger unit into a wall outlet, hence redirecting electrical energy into the current invention, which is much like a conventional electric vehicle. The electric propulsion system 96 draws its electrical energy from the primary electrical system. The energy is used to accelerate the vehicle. Some of this energy is recovered during regenerative braking. The vehicle control system 138 adjusts the power output of the motor-generator at each drive wheel 34 as needed, based on operator inputs, inertial measurements and road conditions measured. Other auxiliary features operate in the essentially same way as they do in a conventional vehicle from the operator's standpoint.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A hybrid electric vehicle, for ground transportation, comprising:

means for distributing high-voltage power, low-voltage power and control signals to high-power components on said vehicle;

means for providing a low-voltage supply and a reliable, digital communication channel;

means for supporting the vehicle's components mechanically and for protecting the occupants during a collision;

means for minimizing the aerodynamic drag of the vehicle and for protecting the interior and internal components from the environmental elements, externally mounted to said spaceframe;

means for maintaining stability, acceleration, deceleration, steering, traction, differential and anti-lock brake controls of said vehicle;

means for generating torque to a plurality of drive wheels via connecting constant-velocity joints to accelerate and decelerate said vehicle, also adapted to be operated as generators, whereupon said means receive torque and generate electric energy;

means for generating torque essentially at higher cruising speeds to a plurality of drive wheels via connecting constant-velocity joints to efficiently sustain the speed of said vehicle;

means for controlling the operations of and transferring energy to and from said means for generating torque and receiving torque to generator electricity and said means for sustaining cruising speed, electrically connected to said power distribution and management bus, digitally connected to said vehicle control system;

means for storing the electrical energy generated onboard said vehicle, for storing the electrical energy received from a charger unit and for supplying high-voltage electrical energy, electrically connected to said power distribution and management bus;

means for supplying electrical power for vehicle acceleration and for receiving and storing electrical energy from regenerative braking, electrically connected to said power distribution and management bus;

means for generating electricity onboard said vehicle, electrically connected to said power distribution and management bus, removably mounted to the underside of said spaceframe;

means for transferring excess heat from significantly heat-producing components of said vehicle to the ambient environment; and, means for receiving electrical energy from the power grid when the vehicle is connected to said power grid, electrically connected to said power distribution and management bus.

2. The hybrid electric vehicle in accordance with claim 1, wherein said means for distributing high-voltage power, low-voltage power and control signals to high-power components on said vehicle comprises a power distribution and management bus.

3. The hybrid electric vehicle in accordance with claim 1, wherein said means for providing a low-voltage supply and a reliable, digital communication channel comprises a high-speed, low-latency, battery-backed, digital vehicle control bus.

4. The hybrid electric vehicle in accordance with claim 1, wherein said means for supporting the vehicle's components mechanically and for protecting the occupants during a collision comprises a lightweight spaceframe.

5. The hybrid electric vehicle in accordance with claim 1, wherein said means for maintaining stability, acceleration, deceleration, steering, traction, differential and anti-lock brake controls of said vehicle comprises a real-time, fail-safe vehicle control system.

6. The hybrid electric vehicle in accordance with claim 1, wherein said means for generating torque to a plurality of drive wheels via connecting constant-velocity joints to accelerate and decelerate said vehicle, also adapted to be operated as generators, whereupon said means receive torque and generate electric energy, comprises a plurality of electric direct-drive high-power motor-generators.

7. The hybrid electric vehicle in accordance with claim 1, wherein said means for generating torque essentially at higher cruising speeds to a plurality of drive wheels via connecting constant-velocity joints to efficiently sustain the speed of said vehicle, comprises a plurality of highly efficient, electric direct drive continuous-duty motor-generators.

8. The hybrid electric vehicle in accordance with claim 1, wherein said means for controlling the operations of and transferring energy to and from said means for generating torque and receiving torque to generator electricity and said means for sustaining cruising speed, electrically connected to said power distribution and management bus, digitally connected to said vehicle control system, comprises a plurality of motor controllers.

9. The hybrid electric vehicle in accordance with claim 1, wherein said means for storing the electrical energy generated onboard said vehicle, for storing the electrical energy received from a charger unit and for supplying high-voltage electrical energy, electrically connected to said power distribution and management bus, comprises a rechargeable, high energy density battery array.

10. The hybrid electric vehicle in accordance with claim 1, wherein said means for supplying electrical power for vehicle acceleration and for receiving and storing electrical energy from regenerative braking, electrically connected to said power distribution and management bus, comprises a high voltage, high power density capacitor array also known as an ultracapacitor.

11. The hybrid electric vehicle in accordance with claim 1, wherein said means for generating electricity onboard said vehicle, electrically connected to said power distribution and management bus, removably mounted to the underside of said spaceframe, comprises a self-contained, interchangeable auxiliary power module.

12. The hybrid electric vehicle in accordance with claim 1, wherein said means for transferring excess heat from significantly heat-producing components of said vehicle to the ambient environment comprises a demand-driven thermal management system.

13. The hybrid electric vehicle in accordance with claim 1, wherein said means for receiving electrical energy from the power grid when the vehicle is connected to said power grid, electrically connected to said power distribution and management bus, comprises a charger unit.

14. A hybrid electric vehicle, for ground transportation, comprising:

a power distribution and management bus, for distributing high-voltage power, low-voltage power and control signals to high-power components on said vehicle;

a high-speed, low-latency, battery-backed, digital vehicle control bus, for providing a low-voltage supply and a reliable, digital communication channel;

a lightweight spaceframe, for supporting the vehicle's components mechanically and for protecting the occupants during a collision;

a lightweight body system, for minimizing the aerodynamic drag of the vehicle and for protecting the interior and internal components from the environmental elements, externally mounted to said spaceframe;

a real-time, fail-safe vehicle control system, for maintaining stability, acceleration, deceleration, steering, traction, differential and anti-lock brake controls of said vehicle;

a plurality of electric direct-drive high-power motor-generators, for generating torque to a plurality of drive wheels via connecting constant-velocity joints to accelerate and decelerate said vehicle, said high-power motor-generators also being adapted to be operated as generators, whereupon said motor-generators receive torque and generate electric energy;

a plurality of highly efficient, electric direct drive continuous-duty motor-generators, for generating torque essentially at higher cruising speeds to a plurality of drive wheels via connecting constant-velocity joints to efficiently sustain the speed of said vehicle;

a plurality of motor controllers, for controlling the operations of and transferring energy to and from said plurality of high-power motor-generators and said plurality of continuous-duty motor-generators, electrically connected to said power distribution and management bus, digitally connected to said vehicle control system;

a rechargeable, high energy density battery array, for storing the electrical energy generated onboard said vehicle, for storing the electrical energy received from a charger unit and for supplying high-voltage electrical energy, electrically connected to said power distribution and management bus;

a high voltage, high power density ultracapacitor, for supplying electrical power for vehicle acceleration and for receiving and storing electrical energy from regenerative braking, electrically connected to said power distribution and management bus;

a self-contained, interchangeable auxiliary power module, for generating electricity onboard said vehicle, electrically connected to said power distribution and management bus, removably mounted to the underside of said spaceframe;

a demand-driven thermal management system, for transferring excess heat from significantly heat-producing components of said vehicle to the ambient environment; and, a charger unit for receiving electrical energy from the power grid when the vehicle is connected to said power grid, electrically connected to said power distribution and management bus.

15. The hybrid electric vehicle as recited in claim 14, wherein said spaceframe further comprising:

a cabin compartment, for carrying occupants and housing interior components; and, a safety shell, for resisting collapse of said cabin compartment during a crash or roof-crush.

16. The hybrid electric vehicle as recited in claim 15, wherein said spaceframe further comprising:

a honeycomb front crumble zone, for absorbing impact during a collision, rigidly attached to said safety shell.

17. The hybrid electric vehicle as recited in claim 14, wherein said body system further comprising:

a plurality of lightweight body panels, for protecting the interior and internal components of said vehicle from the environmental elements; and, a shatter-proof, polymer windows, for improving handling by lowering center of gravity and improving occupant safety, adjustably mounted to said body system.

18. The hybrid electric vehicle as recited in claim 17, wherein said thermal management system further comprising:

an electronic controller and temperature sensors, for determining the demand for cooling;

coolant, for removing heat from components being cooled;

a coolant pump, for circulating said coolant to said components, whose speed is actively controlled by said electronic controller; and, a plurality of heat exchangers, for removing heat from said coolant to the ambient environment.

19. The hybrid electric vehicle as recited in claim 17, wherein said body system further comprising:

a plurality of substantially half-parabolic air diffusers, for reducing frontal aerodynamic drag by allowing air to flow over a more aerodynamically efficient geometry than the visual shape of the vehicle when the vehicle is in forward motion and for diverting air into said thermal management system heat exchangers, attached to the front of said body system;

a finned and substantially ramp-like lower rear air diffuser, for reducing formations of trailing vortex and for increasing downforce to stabilize said vehicle, attached to the rear bottom of said body system; and, a substantially half-parabolic side air diffusers, for reducing aerodynamic drag and supplying cold air to the auxiliary power module and climate control.

20. The hybrid electric vehicle as recited in claim 17, wherein said body system further comprising:

a plurality of photovoltaic cells, for converting sunlight into electricity, attached to the surface of said body panels, electrically connected to said power distribution and management bus.

21. The hybrid electric vehicle as recited in claim 14, wherein said vehicle control system further comprising:

sensors for measuring steering wheel angle, accelerator pedal position, brake pedal position, parking brake handle position, drive mode selection by the operator;

sensors for measuring wheel speeds; and, inertial sensors for measuring longitudinal and lateral accelerations, and roll and yaw rotational rates.

22. The hybrid electric vehicle as recited in claim 14, wherein said vehicle control system further comprising:

a fail-safe, real-time vehicle control computer, for interpreting the input signals from said sensors and for generating control signals for controlling acceleration, deceleration, steering and differentials, electric parking brake, electronic roll and yaw stability controls and anti-lock brakes, electrically connected to said vehicle control bus.

23. The hybrid electric vehicle as recited in claim 14, further comprising:

a high-power, high-voltage, electromagnetically-shielded power management unit, for controlling high-power devices connected to said power distribution and management bus and for monitoring failure conditions on said power distribution and management bus, electrically connected to said vehicle control bus, and electrically connected to said power distribution and management bus; and, an electromagnetic interference filter, for reducing the effects of electromagnetic interference on said vehicle control bus generated by high-power components on said power distribution and management bus.

24. The hybrid electric vehicle as recited in claim 14, further comprising:

a step-down converter, for providing said vehicle control bus and said power distribution and management bus with a regulated low-voltage supply when a high-voltage supply on said power distribution and management bus is available, electrically connected to said power distribution and management bus.

25. The hybrid electric vehicle as recited in claim 14, further comprising:

a low-voltage backup battery, for providing said vehicle control bus and said power distribution and management bus with a low-voltage hold-up when the high-voltage supply is inactive, electrically connected to said vehicle control bus.

26. The hybrid electric vehicle as recited in claim 22, wherein said vehicle control system further comprising:

an electronic drive mode selector, for simulating the mode control of a prior art automobile equipped with an automatic transmission, electrically connected to said vehicle control bus.

27. The hybrid electric vehicle as recited in claim 22, wherein said vehicle control system further comprising:

an electric parking brake, for simulating the park function in a convention automobile equipped with an automatic transmission, electrically connected to said vehicle control bus.

28. The hybrid electric vehicle as recited in claim 14, wherein said vehicle further comprising:

a mission critical vehicle management computer, for controlling non-real-time functions comprising controls for thermal management, air-conditioning, lighting controls, user authentication, powered mirrors, powered windows, door locks and hatch release, electrically connected to the vehicle control computer.

* * * * *